United States Patent
Walker et al.

(10) Patent No.: US 7,505,263 B2
(45) Date of Patent: Mar. 17, 2009

(54) STORAGE DEVICE PROTECTION SYSTEM

(75) Inventors: Philip M. Walker, Fort Collins, CO (US); Fred C. Thomas, Fort Collins, CO (US); Bryce C. Wemple, Fort Collins, CO (US); Kirk N. Ray, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 11/537,098

(22) Filed: Sep. 29, 2006

(65) Prior Publication Data
US 2008/0092247 A1 Apr. 17, 2008

(51) Int. Cl.
*H05K 7/20* (2006.01)

(52) U.S. Cl. .............. 361/685; 169/48; 169/56

(58) Field of Classification Search .......... 169/56, 169/48; 361/685, 683, 732, 699; 726/34
See application file for complete search history.

(56) References Cited

U.S. PATENT DOCUMENTS

| | | | |
|---|---|---|---|
| 4,722,026 A * | 1/1988 | Bennett et al. | 361/679 |
| 5,537,291 A * | 7/1996 | Onodera et al. | 361/699 |
| 6,434,000 B1 * | 8/2002 | Pandolfi | 361/685 |
| 2006/0023418 A1 | 2/2006 | Solomon et al. | |
| 2006/0064709 A1 | 3/2006 | Throckmorton et al. | |
| 2006/0075509 A1 | 4/2006 | Kishon | |

\* cited by examiner

Primary Examiner—Michael C Zarroli

(57) ABSTRACT

A storage device protection system. At least some of the illustrative embodiments are systems comprising a processor, a storage device electrically coupled to the processor, and a protection system. The protection system comprises an enclosure within which the storage device is positioned, and a foam system coupled to the enclosure. The foam system selectively releases foam that substantially encases the storage device, where the foam released in the presence of a predetermined temperature or contact of the computer system with water. Other embodiments are directed to systems having a mounting system that repositions the storage device away from walls of the enclosure in the presence of a predetermined temperature or contact of the computer system with water.

13 Claims, 5 Drawing Sheets

STORAGE DEVICE PROTECTION SYSTEM

BACKGROUND

Home network attached storage devices are computer systems that couple to the home network and provide a central point of storage for home-based operations. In some cases, the network attached storage implements a single hard drive as the single location for storing data. In other systems, the network attached storage implements a redundant array of independent (or inexpensive) disks (RAID) to be the single point of storage but also to protect the home data against data loss caused by hard drive failure.

While such systems may centralize home data storage and protect data against failures of computer system components, such systems do not protect the consumer's data against loss caused by fire and/or flooding.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either: an indirect, direct, optical or wireless electrical connection; or an indirect or direct mechanical connection. Thus, if a first device couples to a second device, that connection may be through a direct connection, through an indirect connection via other devices and connections.

DETAILED DESCRIPTION

The following discussion is directed to various embodiments of the invention. Although at least one of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Embodiments were developed in the context of protecting against data loss in home network attached storage devices, the data loss caused by fire and/or flood. Thus, the discussion is based on the developmental context. However, the embodiments to protect against data loss described in this specification find application in any computer system, not just a home network attached storage device, and therefore the discussion with respect to a home network attached storage device should not be read a limiting the applicability of the embodiments.

Figure 1:
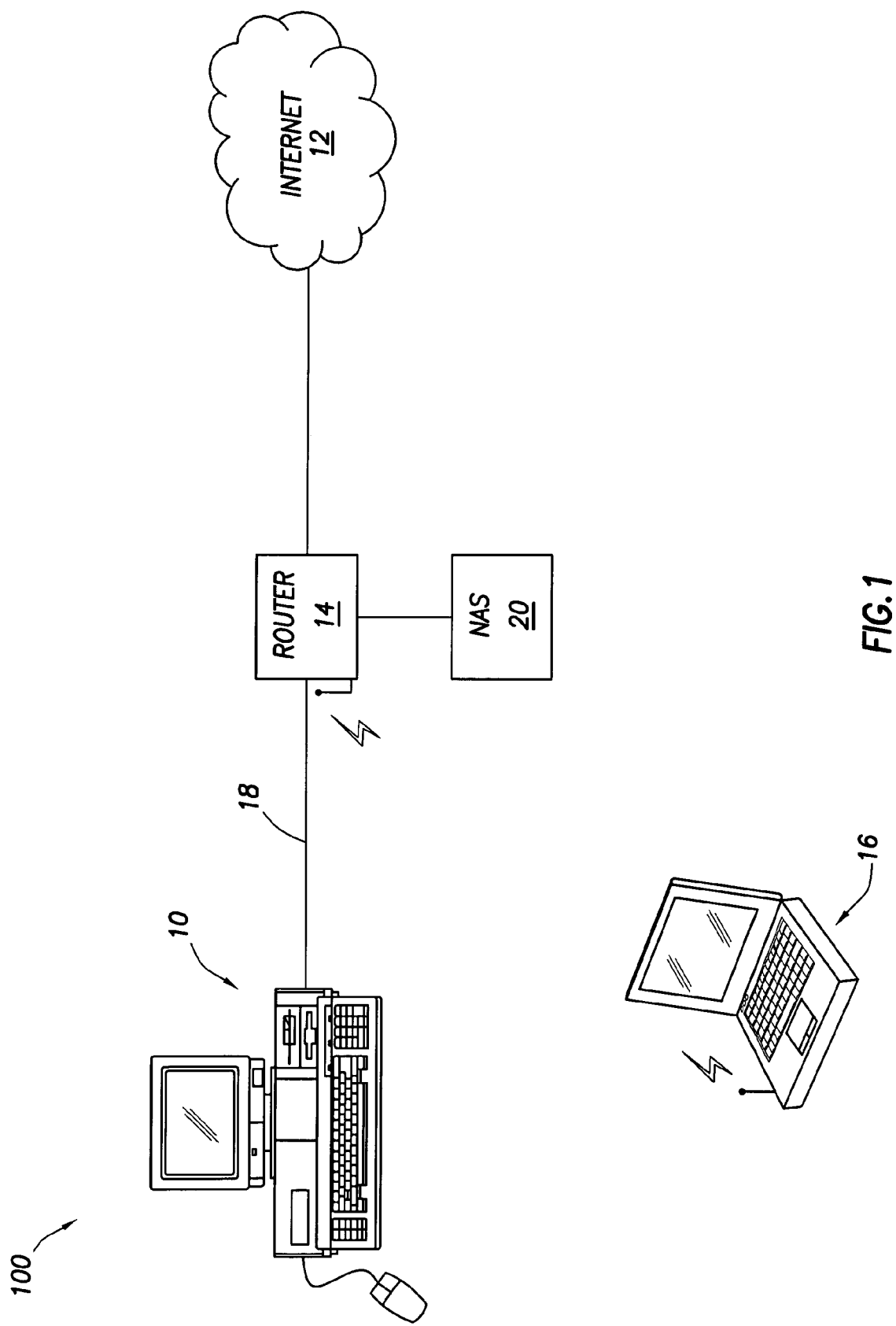
FIG. 1 shows a home network system in accordance with at least some embodiments.

FIG. 1 illustrates a home networking system 100 in accordance with at least some embodiments. In particular, the home networking system 100 comprises an illustrative desktop computer system 10 coupled to the Internet 12 by way of a router 14. The home networking system 100 also comprises a second computer system, in this case a notebook computer 16 coupled to the Internet 12 by way of the router 14. In the embodiments illustrated in FIG. 1, desktop computer 10 couples to the router by way of a hardwired connection 18 (e.g., an Ethernet connection) and illustrative notebook computer 16 couples to the router 14 wirelessly (e.g., IEEE 802.11, Bluetooth). However, computer systems may couple to the router in a hardwired fashion and/or wirelessly without regard to their portability. Further, while the system 100 of FIG. 1 shows only one desktop computer 10 and one notebook computer 16, any number of computers may be coupled to the router using any networking functionality.

The home networking system 100 of FIG. 1 also comprises a network attached storage (NAS) device 20 coupled to the router 14. In accordance with at least some embodiments, the network attached storage device 20 is a storage device and/or server available to any computer system of the home networking system 100 (e.g., desktop computer 10 or notebook computer 16). The network attached storage device 20 may be, for example, the central repository for data generated by computers of the home networking system 100. In the embodiments illustrated in FIG. 1, the storage implemented by network attached storage device 20 is accessible to other computers of the home networking system by way of any suitable currently available networking communication protocol (e.g., Internet Protocol (IP), Transmission Control Protocol/Internet Protocol (TCP/IP), or any after-developed networking protocol.

Figure 2:
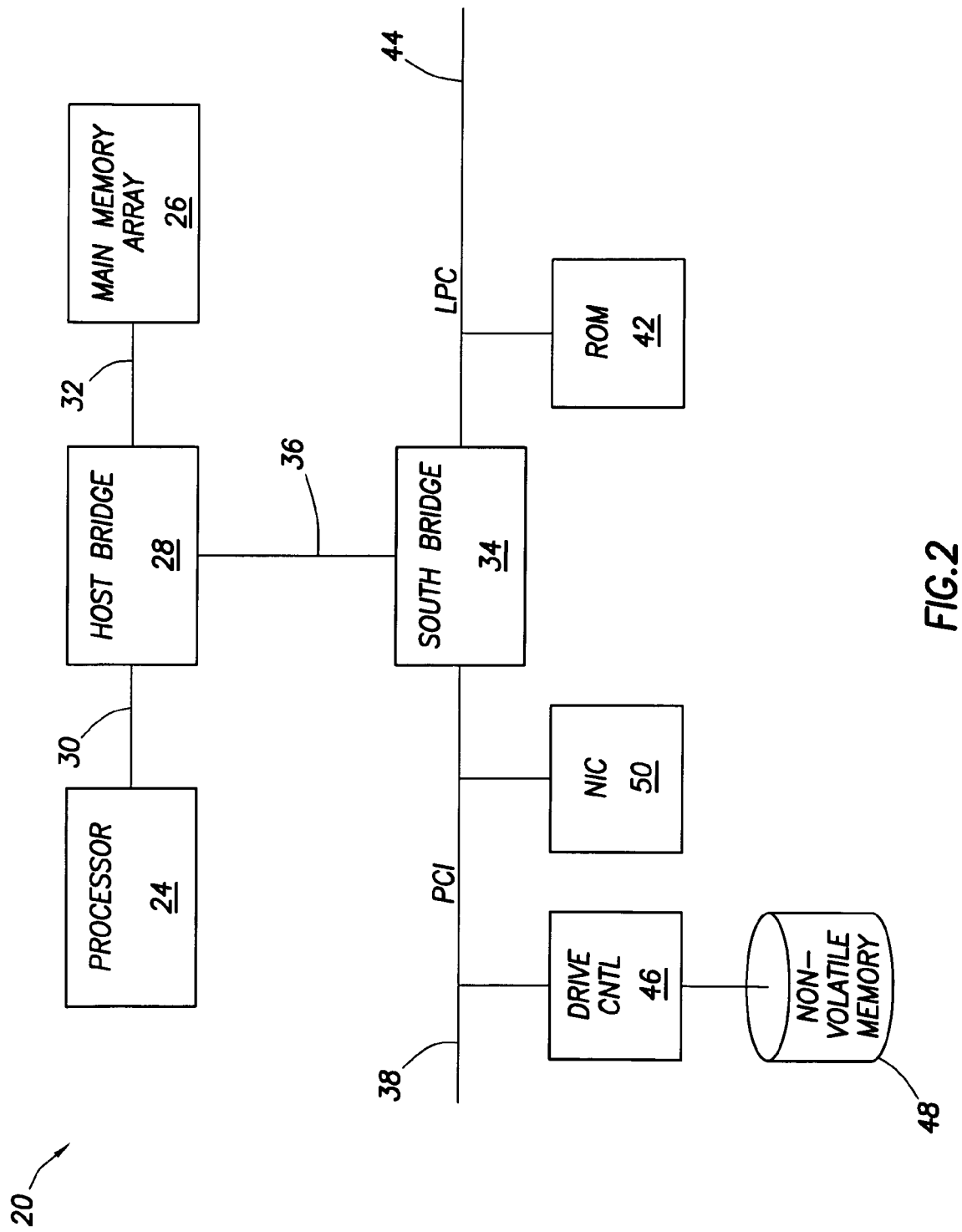
FIG. 2 shows an electrical block diagram of a network attached storage device in accordance with at least some embodiments.

FIG. 2 illustrates in greater detail an embodiment of the network attached storage device 20. In particular, network attached storage device 20, like other computer systems, comprises a processor 24 coupled to a main memory array 26, and various other components, through host bridge 28. The processor 24 couples to the host bridge 28 by way of a host bus 30, or the host bridge 28 may be integrated into the processor 24. The processor 24 may be one of many available processors, and thus the network attached storage device 20 may implement other bus configurations or bus-bridges in addition to, or in place of, those shown in FIG. 2.

Main memory array 26 couples to the host bridge 28 through a memory bus 32. The host bridge 28 comprises a memory control unit that controls transactions to the main memory 26 by asserting control signals for memory accesses. The main memory array 26 functions as the working memory for the processor 24 and comprises a memory device or array of memory devices in which programs, instructions and data are stored. The main memory array 26 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

Still referring to FIG. 2, the network attached storage device 20 also comprises a second bridge 34 that bridges the primary expansion bus 36 to various secondary expansion buses, such as the peripheral component interconnect (PCI) bus 38 and the low pin count (LPC) bus 44. The second bridge 34 may be referred to as the "south bridge" because of its location in computer system drawings. Read only memory (ROM) 42 couples to the south bridge 34, such as by a LPC bus 44. The ROM 42 contains software programs executable by the processor 24 to enable the computer system components to perform as a network attached storage device.

The network attached storage device 20 further comprises a drive controller 46 coupled to the south bridge 34 by way of the illustrative PCI bus 38. In alternative embodiments, the drive controller may couple to the primary expansion bus 36, or any other currently available or after-developed expansion bus. The drive controller 46 controls the non-volatile memory 48, such as a hard drive or optical drive. In some embodiments, the network attached storage device 20 implements a single hard drive where computer systems of the home network can store and retrieve data and programs. In alternative embodiments, the network attached storage device 20 implements a redundant array of independent (or inexpensive) drive (RAID) system where the data and instructions written to the network attached storage are duplicated across multiple hard drives to implement fault tolerance.

Also coupled to the illustrative PCI bus 38 is a network interface card (NIC) 50. In alternative embodiments, the functionality of the NIC 50 is integrated onto the motherboard along with the bridges 28 and 34. Regardless of the precise location where the NIC is implemented, the NIC 50 enables the network attached storage device 20 to communicate with other computer systems on the home networking system 100 (through the router 14 of FIG. 1) such that the network attached storage acts as the central repository for data and programs of the home network system.

Because the network attached storage device 20 is designed to act as a server for the home networking system 100, and possibly to reduce cost, in accordance with at least some embodiments the network attached storage device 20 does not support direct coupling of a display device and/or keyboard. Thus, in some embodiments a network attached storage device 20 does not implement a graphics controller that would couple to a display, and also does not implement an input/output (I/O) controller that would couple to I/O devices such as a keyboard and mouse. To the extent administration is performed on the network storage device 20, the administration may be done remotely using other computer systems (e.g., desktop computer 10 or notebook computer 16) in the home networking system 100.

In accordance with various embodiments, network attached storage devices, and other computer systems, implement a protection system for long term storage devices (e.g., hard drives) which protects the storage devices against damage and resulting data loss caused by heat associate with fire or fire itself. Alternative embodiments protect the storage devices against damage and resulting data loss caused by water (e.g., water submersion). Yet still further embodiments protect against both heat related damage and water related damage. The protection offered against data loss comes in three varieties: physical isolation; selective encapsulation; and combinations of isolation and encapsulation.

Figure 3:
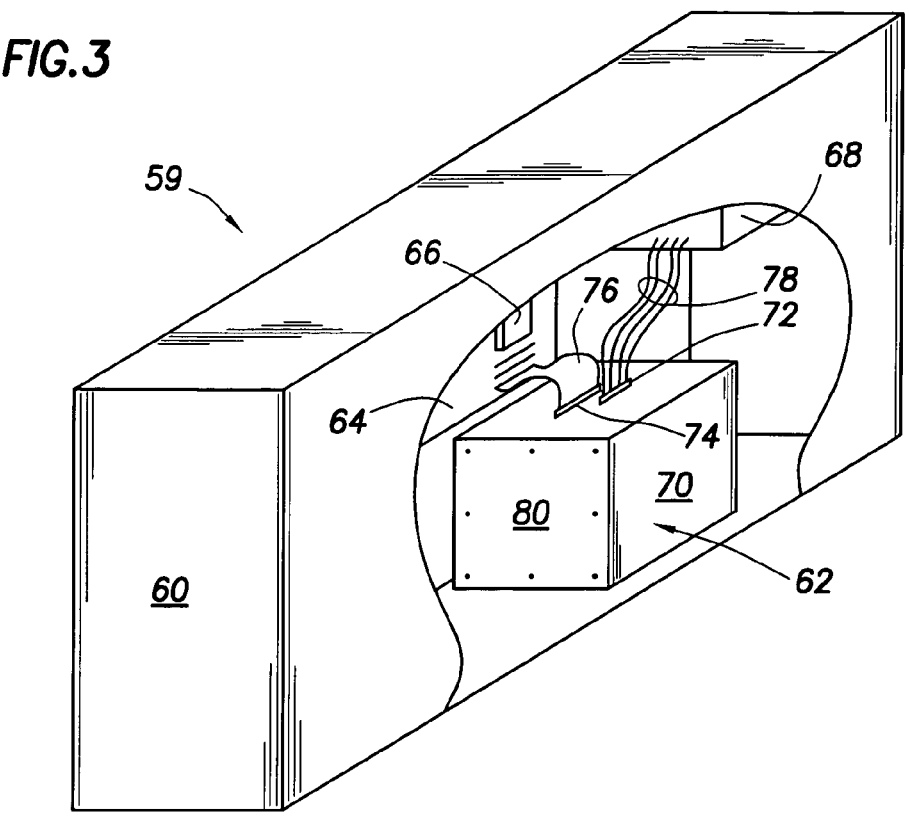
FIG. 3 shows a perspective cutaway view of a network attached storage device in accordance with at least some embodiments.

FIG. 3 illustrates a perspective cut-away view of a computer system 59 having a protection system, where the computer system 59 is, in some embodiments, a network attached storage device. In particular, computer system 59 comprises an outer case 60 within which a protection system 62 is mounted. The outer case 60 may be any suitable outer case or covering, such as a metallic or plastic "desktop" type case, or a plastic or metallic notebook computer outer case. Within the outer case 60 are the various computer system components, such as a motherboard 64 comprising a processor 66, and a power supply 68.

In accordance with some embodiments, the protection system 62 comprises an enclosure 70 within which the long term storage device (e.g., hard drive or optical drive) is coupled. In order to communicatively couple the storage device to the computer system components, the protection system 62 comprises a plurality of connectors 72 and 74 on the enclosure 70. The connectors 72 and 74 couple to corresponding connectors within the enclosure 70, and at least one storage device within the enclosure 70 couples to the corresponding connectors. Although the connectors 72 and 74 are illustrated on the top surface of the enclosure 70, the connectors may equivalently be placed at any other location. In the illustrative case of the storage device being a hard drive, the cables connected to the enclosure may comprise a SCSI cable 76 and a power cable 78; however, other cables may be used dependent upon the type of storage device implemented (e.g., fiber optical cables and serial cables).

Figure 4:
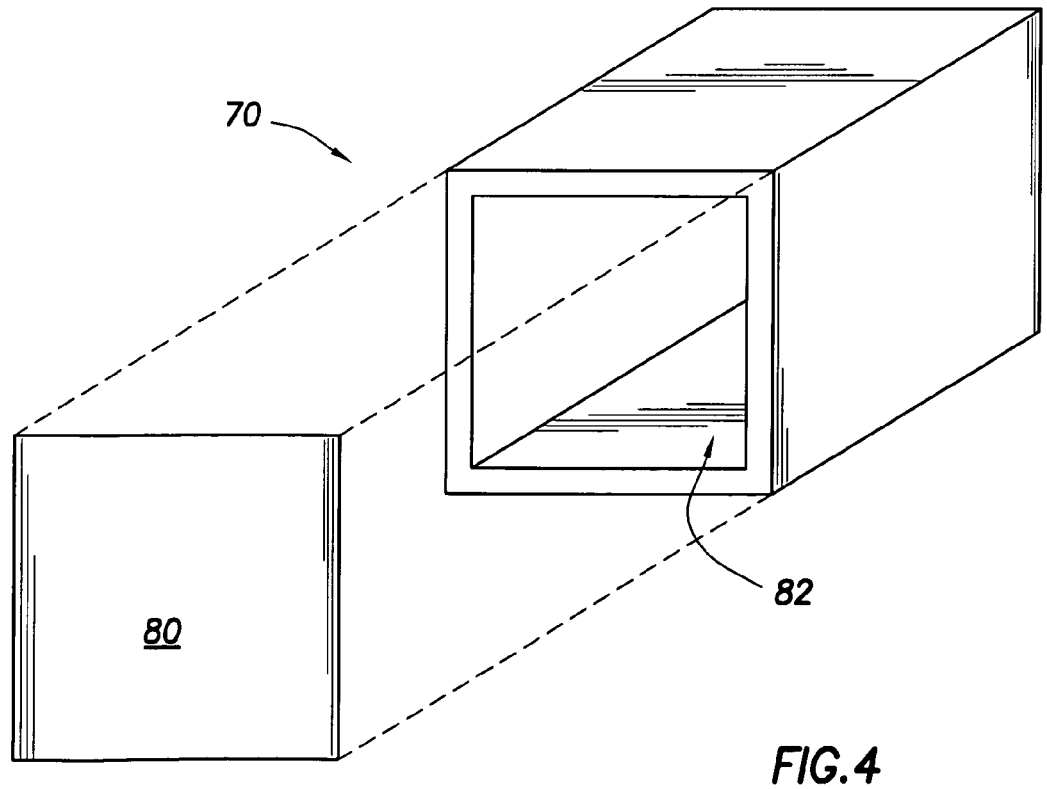
FIG. 4 shows an exploded perspective view of an enclosure in accordance with at least some embodiments.

In accordance with at least some embodiments, the enclosure 70 is water tight or substantially so. In the water tight embodiments, the connectors 72 and 74 form a water tight seal against the enclosure, while still allowing the electrical and/or optical connections to be available within the enclosure. In order to position the storage device within the enclosure 70, the water tight embodiments use an access panel 80. FIG. 4 shows an expanded perspective view of the enclosure 70 and the access panel 80. In particular, in these embodiments enclosure 70 comprises an access aperture 82 through which positioning of one or more storage devices takes place. Once positioned, the access panel 80 occludes aperture 82, and seals such that the enclosure 70 is water tight or substantially so. Any suitable mechanism (e.g., fasteners such as screws, or sliding by way of a tongue-and-groove mechanism) may be used to hold the access panel 80 to the remaining portions of the enclosure 70. Depending on the pressure against which the enclosure 70 remains water tight, in some embodiments a seal (e.g., a rubber gasket) may be used between the access panel 80 and the remaining portions of the enclosure 70. In embodiments using a water tight enclosure 70, the protection system 62 (FIG. 3) thus protects the one or more storage devices within the enclosure 70 from damage and corresponding data loss caused by exposure to water (e.g., flood or fluid spillage).

Figure 5:
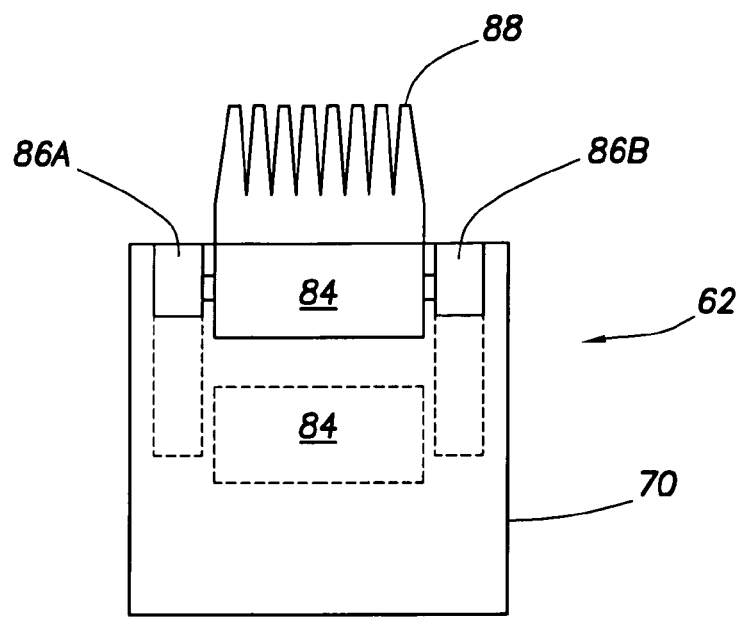
FIG. 5 shows an elevational cut-away view of a protection system in accordance with at least some embodiments.

However, data storage devices such as hard drives generate heat during operation. Some computer systems remove heat by way of convective or forced airflow around the storage device; however, in embodiments where the storage device is sealed within substantially water tight enclosure 70, other mechanisms are used to remove heat from an operating storage device. FIG. 5 shows a front elevational view of the protection system 62 with the access panel 80 removed. In particular, FIG. 5 shows a storage device 84 coupled within the enclosure 70 by way of mounting system 86. Mounting system 86 holds the storage device 84 in thermal contact with a wall of the enclosure 70, and in the particular case of FIG. 5 the upper wall. Thermally coupling the storage device 84 to a wall allows the transfer of heat generated by the storage device to the enclosure 70, and thus to air outside the enclosure 70. Thus, in these embodiments the enclosure is made of a thermally conductive material, such as metallic material. Depending on the heat generated by the storage device 84, the enclosure 70 itself may be sufficient heat sink to keep the operating temperature of the storage device within acceptable limits. If the enclosure alone is insufficient, further embodiments utilize a heat sink 88 thermally coupled to an outer portion of the enclosure 70 to aid in heat dissipation.

The embodiments discussed to this point protect a storage device from damage and corresponding data loss caused by water contact. However, the potential for other catastrophic failures exists for computer systems, such as damage and corresponding data loss caused by heat from any source, heat from fires and/or the fire itself. In accordance with at least alternative embodiments, the enclosure 70 not only protects the storage device from water exposure, but the enclosure 70 also protects the storage device from damage caused heat and/or fire. Having the storage device 84 within a sealed enclosure 70 provides a measure of heat and/or fire protection. However, in high heat situations or direct flame contact, the enclosure 70 may reach high temperatures, and the high temperatures will be conducted to the storage device 84 if the storage device is in thermal contact with the enclosure 70. In order to increase the thermal insulation afforded by the enclosure 70, and in accordance with alternative embodiments, in the event of a fire the mounting system 86 re-positions the storage device 84 away from direct thermal contact with the enclosure 70, as shown by the dashed lines in FIG. 5. Thus, the storage device 84 is surrounding by an insulating layer of air within the enclosure 70, which insulating layer of air protects the storage device 84 from damage and corresponding data loss.

Figure 6A:
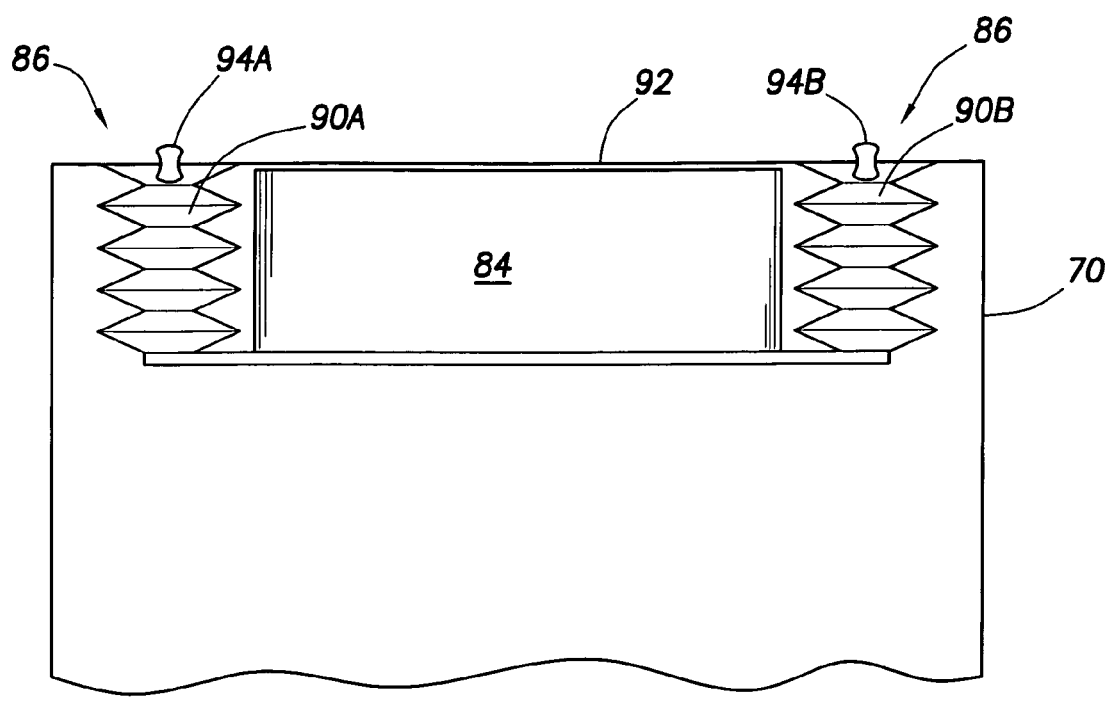
FIG. 6A shows a mounting system in a contracted state in accordance with at least some embodiments.

A mounting system 86 which re-positions the storage device 84 in the event of fire may take many forms. In at least some embodiments, the mounting system comprises a series of bellows. FIG. 6A shows a cross-sectional elevational view of bellows in accordance with at least some embodiments. In particular, the mounting system 86 comprises a set of bellows 90. Each bellow is held under negative gauge pressure (held under a vacuum), and as such the bellows contract. The force associated with contraction of the bellows 90 holds the storage device 84 in direct thermal contact with the wall 92 of the enclosure 70. In these embodiments, the bellows 90 comprise heat sensitive plugs 94A and 94B. The plugs 94 seal the internal volume of the bellows 90 from atmospheric pressure. However, the plugs 94 are construed of heat sensitive material (e.g., low melting point metal) such that when the protection system is exposed to a predetermined temperature, the plugs become soft and are pulled into the internal volume of the bellows 90, thus providing a flow path for air to enter the bellows and allowing the internal volume of the bellows to reach atmospheric pressure. When the vacuum inside the bellows is released, the contraction force on the bellows caused by the pressure differential no longer exists, and thus the bellows expand (either by their own resilience, by virtue of the weight of the storage device 84, or possibly external forces applied by springs).

Figure 6B:
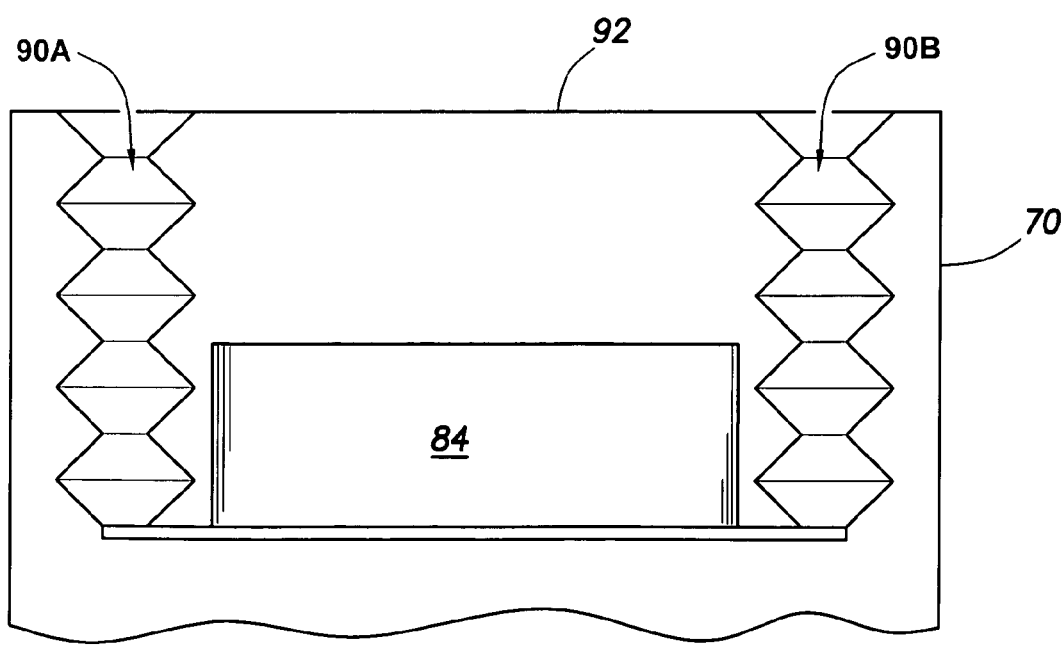
FIG. 6B shows a mounting system in an expanded state in accordance with at least some embodiments.

FIG. 6B illustrates a cross-sectional elevational view of the bellows after the vacuum is released. In particular, when the vacuum is released, the contraction force is removed and the bellows expand in length. In expanding, the storage device 84 is re-positioned away from the wall 92. The re-positioning removes the direct thermal coupling of the storage device 84 to the enclosure 70, and thus allows the enclosure 70 to shield the storage device 84 from the heat associated with the fire.

Figure 7:
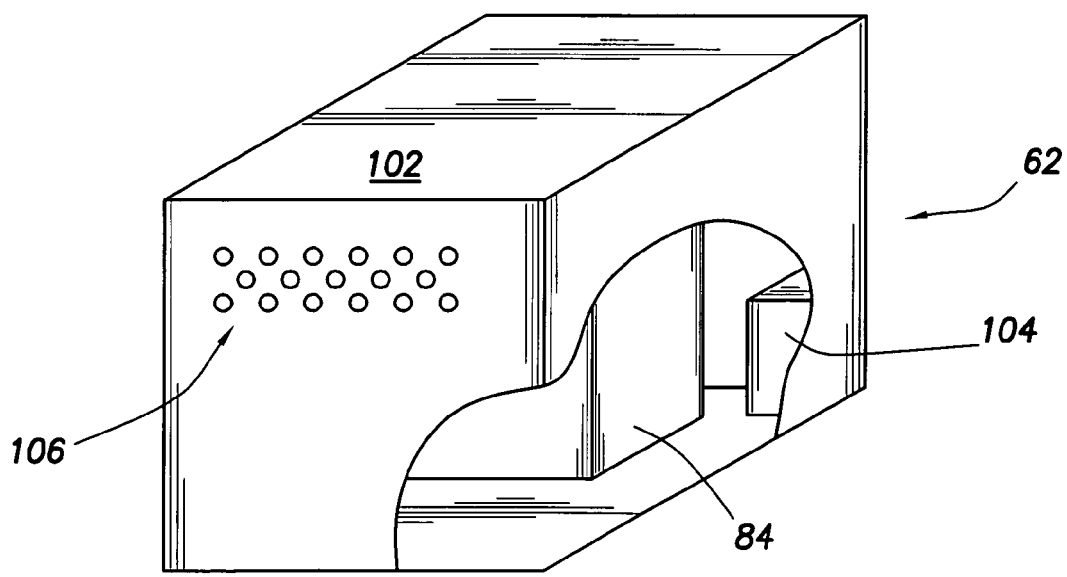
FIG. 7 shows a protection system in accordance with alternative embodiments.

Attention now turns to embodiments where heat and/or water protection of the storage device is implemented by selective encapsulation. FIG. 7 illustrates a protection system 62 in accordance with the alternative embodiments. In particular, the protection system 62 comprises an enclosure 102 and a foam release system 104. Unlike the previous embodiments, in the embodiments that use selective encapsulation, the enclosure 102 is vented, such as vents 106, to allow airflow around the storage device 84. Allowing airflow around the storage device reduces the need to have the storage device 84 in direct thermal contact with the enclosure, and also reduces the need to have a mounting system that re-positions the storage device 84. Thus, in these embodiments the storage device 84 is mounted substantially centered within the volume defined by the enclosure 102.

When the storage device is operating in an environment without the threat of heat or water damage, the volume within enclosure 102 is open to airflow through vents 106. However, in the event of exposure to a predetermined temperature or imminent water contact, the foam release system 104 fills the volume within the enclosure with fire retardant and/or water resistant foam. Any currently available or after-developed foam may be used, such as expanding polyurethane foams or SOUDAFOAM® FR available from AB Sealants LTD of Andover Hampshire, England. It may very well be that the computer system in which the protection system 62 is coupled may be inoperable after the fire or water contact, but the purpose of the protection system is to protect the data on the storage device, even if recovering the data requires extracting the storage device from the encapsulant and coupling the storage device to another computer system.

Triggering the release of the foam can take many forms. In some embodiments electronically monitored heat and water sensors are used, and when a predetermined temperature and/or water is sensed, the foam release system 104 is triggered, along with shutting down the computer system in which the protection system 62 is implemented. Other embodiments trigger release of the foam using passive systems that do not rely on the presence of electrical power. For example, spring based mechanical systems that are released by high temperature or rising water may be used to trigger release of the foam from the foam release system 104. In some embodiments, the foam may be stored in an aerosol can and discharged using the aerosol propellant. In other embodiments, the foam may be encapsulated in heat and/or water sensitive materials, such that when high heat and/or water is present, the encapsulant deteriorates and releases the foam for expansion. Any mechanism, electronic, mechanical or chemical, for detecting high temperature and/or water presence may be equivalently used.

Finally, the embodiments using sealed enclosures and re-positioning of the storage device are not mutually exclusive from selective foam encapsulation of the storage device. In particular, the selective encapsulation discussed with respect to FIG. 7 may be used in embodiments where enclosure is sealed. In these alternative embodiments, when the mounting system 86 re-positions the storage device, the re-positioning triggers release of insulating foam within the enclosure 70. Thus, not only is the storage device thermally separated from the heat of the enclosure 70, but the storage device is also encapsulated by insulating material, which increases the likelihood of survival of the storage device in the event of a fire.

The above discussion is meant to be illustrative of the principles and various embodiments of the present invention. Numerous variations and modifications will become apparent to those skilled in the art once the above disclosure is fully appreciated. For example, the enclosure need not necessarily be a cube or rectangular shape, and instead, the enclosure may take any suitable shape (e.g., spherical). Moreover, while the protection system is discussed in relation to a network attached storage device, the protection system may be used in any computer system where damage due to fire and/or water exposure is a possibility. In the embodiments that perform selective encapsulation, the enclosure within which the encapsulant is released may comprise, in whole or in part, an outer case of the computer system. Further still, the specification discusses protecting the storage device from heat caused by fire, but the protection systems discussed may be used to protect the storage device from heat caused by any source, not just fire. It is intended that the following claims be interpreted to embrace all such variations and modifications

What is claimed is:

1. A computer system comprising:
    a processor;
    a storage device communicatively coupled to the processor; and
    a protection system comprising:
        an enclosure having walls; and
        a mounting system within the enclosure and to which the storage device is coupled;
        wherein the mounting system holds the storage device against at least one of the walls when the storage device is in operation, and wherein the mounting system positions the storage device away from the walls in the event of exposure to a predetermined temperature.

2. The system as defined in claim 1 wherein the predetermined temperature is a temperature indicative of fire.

3. The system as defined in claim 1 wherein the processor and storage device are components of at least one selected from the group consisting of a network attached storage device; a desktop computer; and a notebook computer.

4. The system as defined in claim 1 wherein the storage device is a hard drive.

5. The system as defined in claim 1 wherein the protection system further comprises a substantially water tight enclosure within which the storage device is mechanically coupled.

6. The system as defined in claim 1 wherein the mounting system further comprises:
    bellows under pressure, wherein the storage device couples to the bellows;
    a heat sensitive seal coupled to the bellows, wherein when exposed to a predetermined temperature, the heat sensitive seal releases the pressure and the bellows positions the storage device away from the walls.

7. The system as defined in claim 6 wherein the bellows further comprises bellows under negative gauge pressure.

8. The system as defined in claim 1 wherein the protection system further comprises:
    a foam release system coupled to the enclosure;
    wherein when the mounting system positions the storage device away from the walls, the foam system releases expandable foam that substantially encases the storage device in an insulating foam.

9. A system comprising: an enclosure having at least one wall and defining an internal volume, wherein the enclosure is positionable within a computer system; a mounting system within the internal volume of the enclosure, wherein a storage device couples to the mounting system; and wherein the mounting system holds the at least one storage device against at least one wall when the storage device is in operation, and wherein the mounting system positions the storage device away from the at least one wall in the event the system is exposed to at least one selected from the group consisting of temperature in excess of a predetermined temperature and water.

10. The system as defined in claim 9 wherein the mounting system further comprises:
    bellows under pressure, wherein the storage device mechanically couples to the bellows;
    a heat sensitive seal coupled to the bellows, wherein when exposed to a predetermined temperature, the heat sensitive seal releases the pressure, and the bellows positions the storage device away from at least one wall.

11. The system as defined in claim 10 wherein the bellows further comprises bellows under negative gauge pressure when the bellows hold the storage device against at least one wall.

12. The system as defined in claim 9 further comprising:
    a foam system coupled to the enclosure;
    wherein when the mounting system positions the storage device away from the walls, the foam system substantially encases the storage device in foam.

13. The system as defined in claim 9 wherein the enclosure is substantially water tight.

* * * * *